(12) United States Patent
Mizumo et al.

(10) Patent No.: US 6,334,030 B1
(45) Date of Patent: Dec. 25, 2001

(54) DATA GENERATING DEVICE AND A PORTABLE APPARATUS PROVIDED WITH A DATA GENERATING DEVICE

(75) Inventors: Yoshiyuki Mizumo, Kaiduka; Makoto Ando, Tondabayashi, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/166,639

(22) Filed: Oct. 5, 1998

(30) Foreign Application Priority Data

Oct. 3, 1997 (JP) .................................................. 9-271492

(51) Int. Cl.$^7$ .................................................. G03B 17/24
(52) U.S. Cl. .......................... 396/310; 396/287; 396/434
(58) Field of Search .................................. 396/310, 311, 396/315, 318, 319, 287–292, 434; 368/10, 21, 22; 364/705.08

(56) References Cited

U.S. PATENT DOCUMENTS

| | | | | |
|---|---|---|---|---|
| 4,428,681 | * | 1/1984 | Kashio | 368/21 |
| 4,884,254 | * | 11/1989 | Kawai et al. | 368/21 |
| 4,887,251 | * | 12/1989 | Takada | 368/21 |
| 4,901,296 | * | 2/1990 | Mitchell | 368/21 |
| 4,956,829 | * | 9/1990 | Mitchell | 368/21 |
| 4,995,020 | * | 2/1991 | Mitchell | 368/21 |
| 5,007,033 | * | 4/1991 | Kubota et al. | 368/21 |
| 5,089,814 | * | 2/1992 | DeLuca et al. | 368/21 |
| 5,490,122 | * | 2/1996 | Kojima | 368/21 |
| 5,724,243 | * | 3/1998 | Westerlage et al. | 364/446 |
| 5,845,257 | * | 12/1998 | Fu et al. | 368/21 |
| 6,198,696 | * | 3/2001 | Korpi et al. | 368/21 |

FOREIGN PATENT DOCUMENTS 3-103434 10/1991 (JP) .
4-44634 4/1992 (JP) .

* cited by examiner

Primary Examiner—David M. Gray
(74) Attorney, Agent, or Firm—Morrison & Foerster LLP

(57) ABSTRACT

A portable apparatus or camera is provided with: a basic date data generator for generating basic date data based on a standard time of a first place; a display device for displaying date data; a first memory for storing data on a second place and data on travel schedule for the second place; a second memory for storing data on time difference between the standard time of the first place and a standard time of the second place; a field date data generator for changing generated basic date data into field date data of the second place based on the time difference data stored in the second memory; a judging device for judging, based on the travel schedule data, whether generated basic date data corresponds to a traveling period of the second place; and a controller for controlling the display device to display the field date data of the second place when the generated basic date data is judged to correspond to a traveling period of the second place.

22 Claims, 11 Drawing Sheets

FIG. 14

```
    DATE INPUT ; GO
DATE ; 08.14, 1997
COUNTRY ; ENGLAND
PLACE ; LONDON
TERM ; 8.14~ 8.31, 1997
MEMO ; CITY
```
~13

FIG. 15

```
8. 14, 1997
PM 3 : 31
ENGLAND 8. 14, 1997
AM 11 : 31
NEW YORK
```
~13

DATA GENERATING DEVICE AND A PORTABLE APPARATUS PROVIDED WITH A DATA GENERATING DEVICE

This application is based on patent application No. 9-271492 filed in Japan, the contents of which is hereby incorporated by reference.

THE BACKGROUND OF THE INVENTION

This invention relates to a date generator capable of generating time data or other, and a portable apparatus provided with such a data generating device.

In portable apparatus such as cameras, conventionally, a date display device is generally provided on the rear surface of a camera main body to imprint date data in a part of a photographed frame when photographing is performed. The date display device provided in the camera also enables an adjustment of time, a change of a display mode (a display mode of month/day/year) and a selection of date display (i.e., whether or not a date is to be imprinted in a photographed picture).

In some known cameras, a world map is displayed on the rear surface of a camera main body and, when a preset country is designated, a date displayed is changed to the one based on the standard time of the designated country. Portable information input apparatus such as electronic organizer or PDA have been commercially available to allow an easy input of a travel schedule and the like.

The content of the date display is manually changed in the date display device provided in the conventional camera and portable information input apparatus. Accordingly, if a user brings them to a country or an area which has a time difference from a country or area where he lives such as when he travels abroad, a cumbersome operation is required to manually change a date to be displayed to a date in that country or area. In the portable information input apparatus, a period during which the user stays in the foreign country or other area is known by inputting a travel schedule. Thus, in the case that the user travels to the foreign country as scheduled, it is convenient if the date display is automatically changed to the date in that country or area during his stay. However, since the content of the schedule and the date are not linked to each other, the date to be displayed cannot automatically be switched to the one in that country or area during the period of the travel.

In the case of cameras, the date displayed in the date display device is imprinted in the photographed picture. Accordingly, unless a user changes the date display of the date display device during the travel to a foreign country, the automatic date imprinting causes a problem. Thus, in cameras, if the displayed date of the date display device is automatically changed to a local date when the user travels to a foreign country or the like, it can advantageously avoid a cumbersomeness to manually change the date and prevent an error date imprinting. Therefore, a function of automatically changing the date display becomes more effective.

SUMMARY OF THE INVENTION

It is an object of the invention to provide a data generating device and a portable apparatus which have overcome the above problems residing in the prior art.

According to an aspect of the invention, a data generating device comprises: a basic date data generator which generates basic date data of a basic place; a memory which stores data concerning places, and data concerning schedule of travel between places; and a field date data generator which judges, based on the place data and the schedule data stored in the memory, where a field place is, and generates date data of a judged field place based on the basic date data and the judged field place.

According to another aspect of the invention, a data generating device comprises: a first date data generator which generates first date data; a memory which stores a relationship between the first date data and date data of a field place; and a second date data generator which judges, based on the first date data, where a field place is, and generates second date data based on the first date data and the relationship.

According to still another aspect of the invention, a portable apparatus comprises: a basic date data generator which generates basic date data of a basic place; an input section through which place data concerning places and travel schedule data are input; a memory which stores input place data and schedule data in connection with the input place data; and a field date data generator which judges, based on the place data and the schedule data stored in the memory, where a field place is, and generates date data of a judged field place based on the basic date data and the judged field place.

According to yet another aspect of the invention, a portable apparatus comprises: a first date data generator which generates first date data; an input section through which date data of places are input; a memory which stores a relationship between the first date data and date data of places; and a second date data generator which judges, based on the first date data, where a field place is, and generates second date data based on the first date data and the relationship.

According to further another aspect of the invention, a camera comprises: means for generating basic date data based on a standard time of a first place; means for displaying date data; first means for storing data on a second place and data on travel schedule for the second place; second means for storing data on time difference between the standard time of the first place and a standard time of the second place; means for changing generated basic date data into field date data of the second place based on the time difference data stored in the second storing means; means for judging, based on the travel schedule data, whether generated basic date data corresponds to a traveling period of the second place; and means for controlling the displaying means to display the field date data of the second place when the generated basic date data is judged to correspond to a traveling period of the second place.

These and other objects, features and advantages of the present invention will become more apparent upon a reading of the following detailed description and accompanying drawings.

BRIEF DESCRIPTION OF THE DRAWINGS

FIG. 14 is a diagram showing an inputted schedule of a travel to England;

FIG. 15 is a diagram showing that a local time displayed is changed during the travel to a foreign country;

DETAILED DESCRIPTION OF THE PREFERRED EMBODIMENTS OF THE INVENTION

Figure 1:
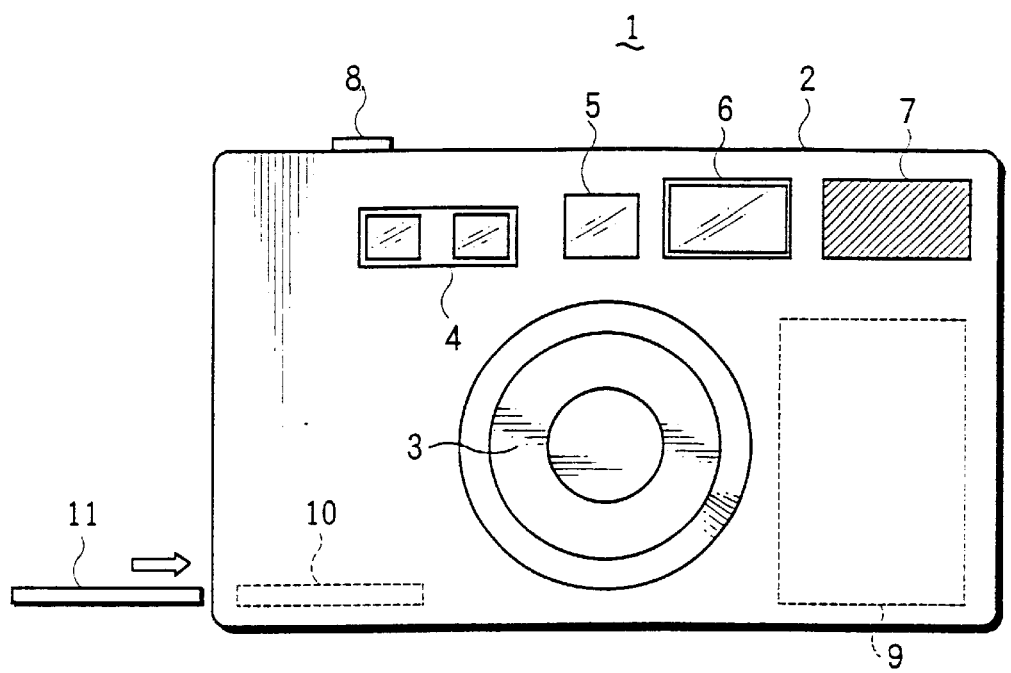
FIG. 1 is a front view of a camera embodying the invention provided with a data generating device.
Figure 2:
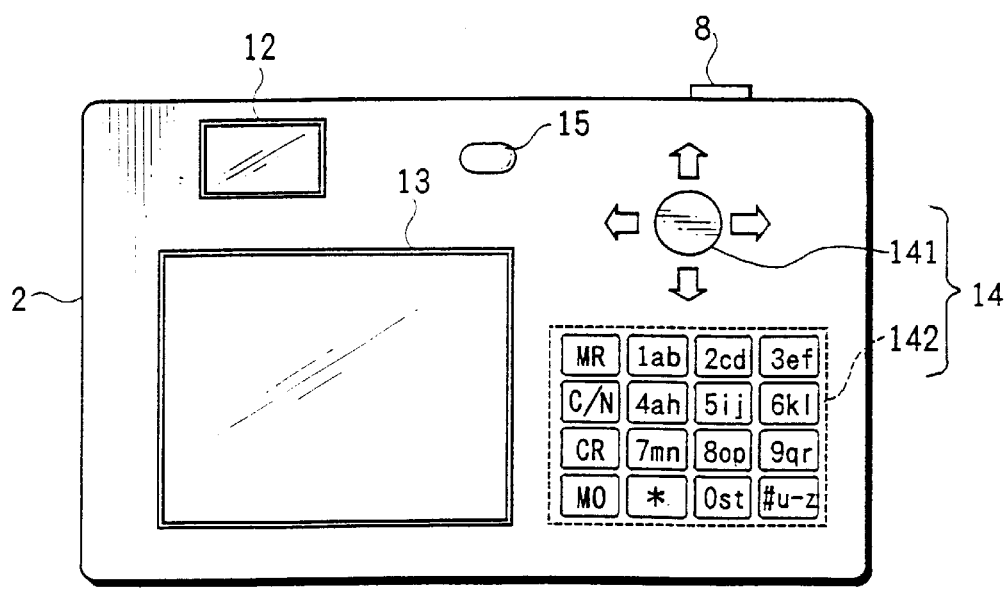
FIG. 2 is a rear view of the camera.
Figure 3:
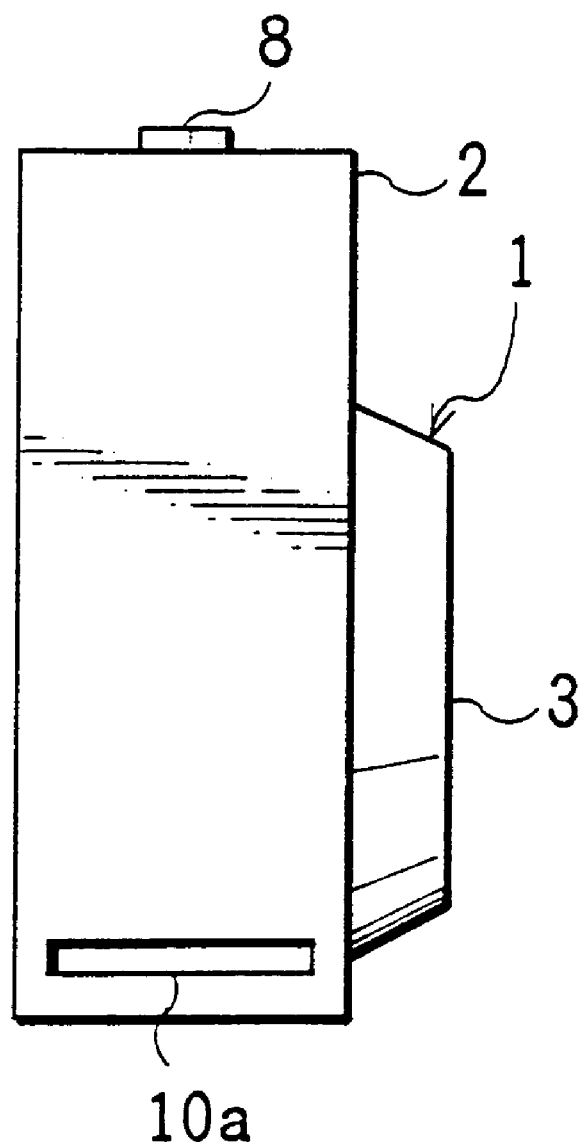
FIG. 3 is a right side view of the camera.

FIGS. 1 to 3 shows a camera adopting the Advanced Photo System (hereinafter, referred to as "APS").

The camera 1 is provided with a taking lens 3 substantially in the middle of the front surface of a camera main body 2. A distance meter 4, a light meter 5 and a viewfinder optical system 6 are provided above the taking lens 3. A built-in flash 7 and a shutter release button 8 are provided in upper right and left ends of the front surface of the camera main body 2, respectively. A cartridge chamber 9 for mounting a film cartridge containing a film is provided below the built-in flash 7 inside the camera main body 2. The film cartridge is mountable into the cartridge chamber 9 from the bottom side of the camera main body 2.

Figure 4:
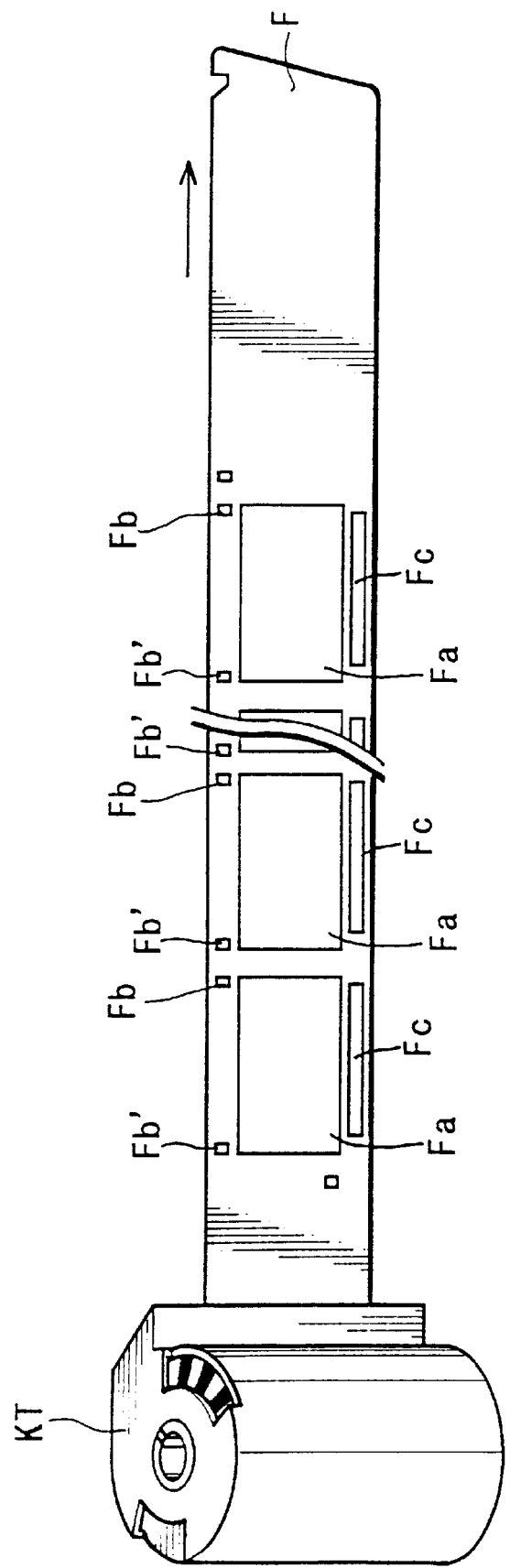
FIG. 4 is a perspective view showing a configuration of a film to be used in the camera.

A film of the APS is completely contained in a film cartridge KT as shown in FIG. 4. When the film cartridge KT is mounted in the film chamber 9, a film F is dispensed from the film cartridge KT by a film loading mechanism of the camera 1 to set an exposure area Fa of the leading frame in a predetermined exposure position (where the exposure area Fa faces an exposure frame provided behind an optical axis of the taking lens 3).

At an upper edge of the film F in FIG. 4 are formed a pair of perforations Fb, Fb' at the opposite ends of the exposure area Fa of each frame. A film feed control including the loading, winding and rewinding of the film F is performed in accordance with a detection signal of an optical sensor such as a photoreflector for detecting the perforations Fb, Fb'. At a lower edge of the film F in FIG. 4 are provided magnetic recording portions Fc along the exposure areas Fa of the respective frames. Pieces of information concerning an image recorded in the exposure area Fa of each frame such as a date of photographing, information as to whether the photographed image is vertically or horizontally framed, exposure control values and a magnification (2-bit data) are magnetically recordable in the magnetic recording portions Fc.

Referring back to FIG. 1, an IC card chamber 10 in which the IC card 11 is mountable is provided at the bottom end of the camera main body opposite from the cartridge chamber 9. As shown in FIG. 3, the IC card 11 is mounted and ejected through a card slot 10a formed in a bottom portion of the right side surface of the camera main body 2.

Figure 5:
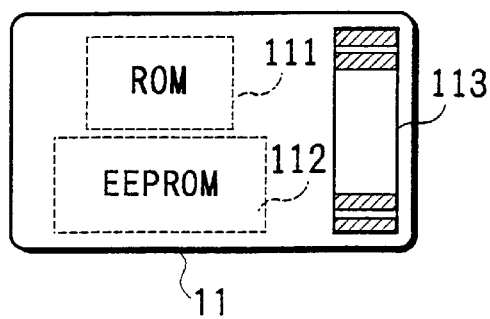
FIG. 5 is a diagram showing a configuration of an IC card.

The IC card 11 is a special card for storing pieces of information concerning the photographing, schedules, customer management, events, etc. The IC card 11 is a rectangular thin plate and is packaged with a ROM (read only memory) for storing data representing a preset format used to input the data and an EEPROM 112 in which the data inputted in accordance with the input format is reloadably written. A plurality of electrode terminals 113 (see FIG. 5) are provided at one end of the IC card 11, and the IC card 11 is externally connected via the electrode terminals 113 with a controller 22 (see FIG. 12) provided in the camera main body 2 for centrally controlling the photographing operation of the camera 1.

There are different types of IC cards 11 specially tailored for specified applications including a photographing information card, a schedule card or a business card (for customer management). In the ROM 111 of each card 11 is stored an input format data in conformity with the application of this card 11. The input format is described later. It should be appreciated that a plurality of input format data may be stored in one card and that a data input may be enabled in accordance with an input format corresponding to a selected desired application.

Figure 6:
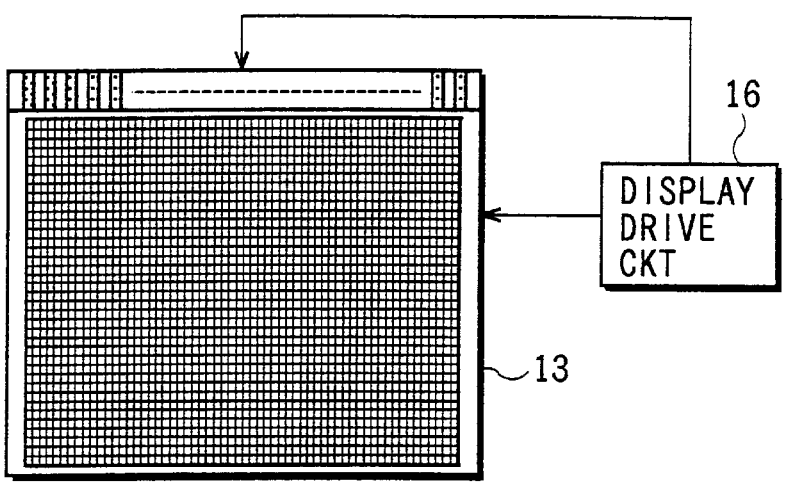
FIG. 6 is a diagram showing a construction of an LCD display device.

In the rear surface of the camera main body 2, a viewfinder window 12 and a power switch 15 are provided in an upper left end and in an upper middle portion as shown in FIG. 2. A display device 13 is provided between the viewfinder window 12 and the power switch 15. The display device 13 is a liquid crystal display of dot-matrix type as shown in FIG. 6. The emission control of the respective dots (pixels) of the display device 13 (hereinafter, "LCD device 13") is performed in accordance with a vertical drive signal and a horizontal drive signal outputted from a display drive circuit 15. For example, the dots where both drive signals are at high level are turned on, and dots where at least either one of the drive signals are at low level are turned off.

Although the display device 13 is the LCD device of dot-matrix type in this embodiment, it may be constructed by combining the LCD device of this type and a conventional LCD device for the symbol display. Such an arrangement enables a reduction in the number of dots of the LCD device of dot-matrix type and, consequently, the construction of the display device 13 and the drive control can be simplified.

On the right side of the LCD device 13 is provided a key operation unit 14, which includes a direction designating key 141 for designating an input position of data displayed in the LCD device 13 and a key switch group 142 which is operated to alphanumerically input data, change modes and give an instruction to store/clear the input data.

The direction designating key 141 includes a round operation button inclinable in upward, downward, leftward and rightward directions. When the key 141 is rotated in one of the arrow directions, the designation of this direction is inputted. In selecting items, a desired item is selected from a selection menu by pushing the key 141 standing upright without being inclined.

The key switch group 142 is comprised of 4×4 (a total of 16) key switches. 12 key switches (hereinafter, alphanumeric keys) excluding those in a left end column are used to alphanumerically input characters and numbers, including symbols * and #. The respective keys except * have multiple functions. For example, an alphanumeric key "1ab" can be used to input a number "1" and character "a" or "b" and its associated characters.

The four key switches in the left end column (hereinafter, function keys) are used to store/clear the data inputted by the alphanumeric keys, set the modes, and change the alphanumeric data. The function key "MR" is operated to give an instruction to store the input data displayed in the LCD device 13 in the IC card 11. The function key "C/N" is operated to switch a character input and a numerical input by the alphanumeric keys. The function key "CR" is operated to give an instruction to clear the input data displayed in the LCD device 13. The function key "MO" is operated to set a desired mode concerning the display.

In this embodiment, at least "magnetic data input mode", "data input mode", "input data confirmation mode" and "date display mode" are available as modes concerning the display. The "magnetic data input mode" is a mode for inputting data to be recorded in the magnetic recording area Fb of the film F. The "data input mode" is a mode for storing the data input in accordance with a specified input format stored in the IC card 11. The "input data confirmation mode" is a mode for confirming and, if necessary, correcting the content of the input data stored in the IC card 11. The "date display mode" is a mode for displaying a basic time and is initially set when the camera 1 is activated. In other words, the "date display mode" is a display mode in a usual state.

Codes comprised of two numbers are allotted to the respective modes. For example, the codes "00", "01", "02" and "02" are respectively allotted to the "date display mode", "data input mode", "input data confirmation mode" and "magnetic data input mode". By inputting specified two numbers after the mode key is operated, a mode corresponding to this code is set.

For example, if the key switches are operated in the order of "MO", "0st", "1ab", the data input mode is set to enable specified information conforming to the application of the IC card 11 to be newly inputted in accordance with the specified input format stored in the IC card 11. If the key switches are operated in the order of "MO", "0st", "2cd", the input data confirmation mode is set and the input data stored in the IC card 11 is displayed in the LCD device 13 to enable a conformation and correction of the content of the input data. Further, if the key switches are operated in the order of "MO", "0st", "3ef", the magnetic data input mode is set to enable a data input by the key operation unit 14 to be recorded in the magnetic recording area Fb of the film F.

Figure 7:
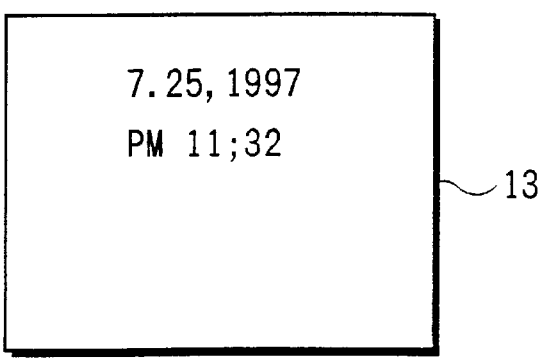
FIG. 7 is a diagram showing a date display in the LCD display device in a "date display mode"

As described above, when the camera 1 is activated, the "date display mode" is initially set and a date is displayed as shown in FIG. 7.

In the data input mode, the input format data is read from the ROM 111 of the IC card 11 and displayed in the LCD device 13. This input format is comprised of the selection of an input item and an input of data corresponding to the selected item. The selection of the input item is made by selecting the selection item displayed in the LCD device 13 by the direction designating key 141, and the input of data corresponding to the selected item is performed by inputting characters, numbers and the like one by one by operating the alphanumeric keys of the key switch group 142 in an input position of this item.

Figure 8:
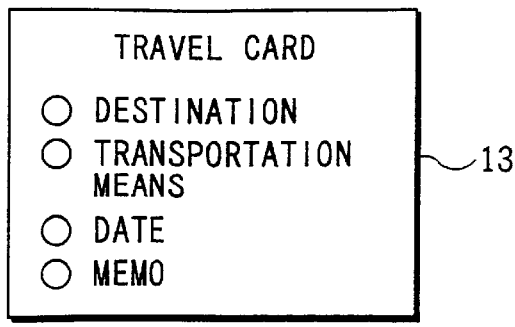
FIG. 8 is a diagram showing an initial screen of a travel schedule.
Figure 9:
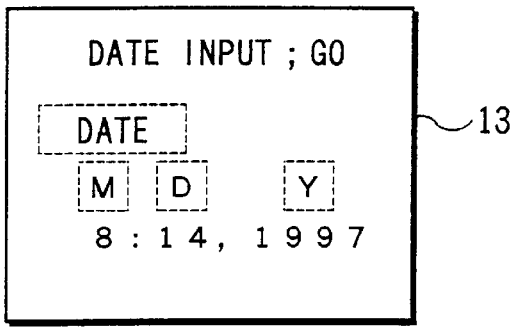
FIG. 9 is a diagram showing an input screen when an item "date" is selected in the initial screen of the travel schedule.
Figure 10:
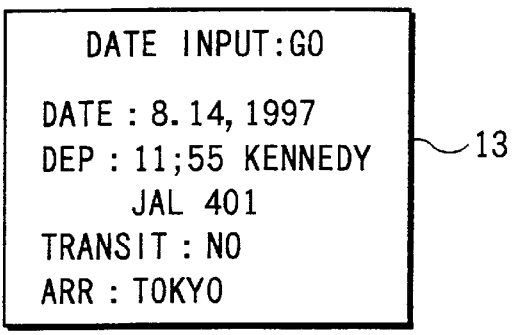
FIG. 10 is a diagram showing a next input screen when the data input is completed in the input screen of the "date"

For example, if the data input mode is set in the case that the IC card 11 for the travel schedule is mounted in the camera 1, display screens shown in FIGS. 8 to 10 are displayed in the LCD device 13. The display screen of FIG. 8 is a selection screen. In this screen, four items: "DESTINATION", "TRANSPORTATION MEANS", "DATE" and "MEMO" are selectable. An item possible to be selected is made distinguishable from the others by reverse-display or the like. The item in reverse-display is changed by operating the direction designating key 141 upward and downward. A desired item is selected by pushing the key 141 in the middle while being in reverse-display.

FIG. 9 shows an exemplary input screen in the case that the item "DATE" is selected in the display screen shown in FIG. 8. In this screen, a date of travel can be inputted in month/day/year. Positions where data are to be inputted are indicated by reverse-display. In FIG. 9, a data "8.14, 1997" is already inputted.

When the date data is inputted in the order of "M", "D", and "Y" the display content of the LCD device 13 is switched to an input screen shown in FIG. 10, and an input of a means of transportation used on that day is made possible. Similar to the inputting method of the date data, a data representing a desired means of transportation is inputted by operating the alphanumeric keys in the input position in reverse-display. In the case of an error input, the input data in reverse-display is cleared by operating the "CR" key and a data can be inputted in this position again.

If the data are inputted in all items as described above and the "MR" key is finally operated, the inputted data are stored in the EEPROM 112 of the IC card 11, and the display content of the LCD device 13 is returned to the display screen of FIG. 8 to enable an input of a next schedule.

When the input data confirmation mode is set, the input format data and the already inputted data are read from the IC card 11 and displayed in the LCD device 13. In the aforementioned example, the data inputted in accordance with the input format are already written as shown in FIGS. 8 to 10. Since this display screen is adapted to enable the confirmation and correction of data, the inputted data can be confirmed by successively renewing the selection items or input items without correcting the contents of the respective selection items or input items. If necessary, the data can be corrected by newly inputting a data.

As described above, since the specified input format data is stored so that the pieces of information corresponding to the application of the IC card 11 can hierarchically be inputted, necessary pieces of information can easily be inputted in accordance with the input format and the inputted data can be confirmed.

Although pieces of information not directly relevant to the photographing are inputted in the example of the above input format, pieces of information concerning the photographing which is to be recorded in the magnetic recording area Fb of the film F (hereinafter, "photographing information") may supplementarily be inputted. The amount and content of the information to be recorded in the magnetic recording area Fb are specifically limited by the standards of the Advanced Photo System. A degree of freedom of the photographing information is enhanced by storing the pieces of photographing information beyond the specified levels in the IC card 11.

Figure 11:
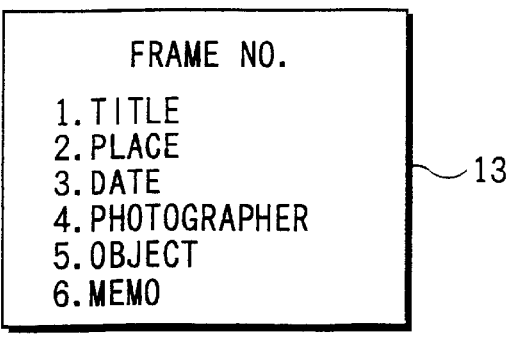
FIG. 11 is a diagram showing an input mode for pieces of photographing information.

FIG. 11 is a diagram showing exemplarily an input format for the pieces of photographing information. When the IC card 11 for storing the pieces of photographing information is mounted in the camera 1 and the data input mode is set, an initial screen shown in FIG. 11 is displayed in the LCD device 13. In the input screen of FIG. 11, items "FRAME NO.", "TITLE", "PLACE", "DATE", "PHOTOGRAPHER", "OBJECT"and "MEMO"can selectively be inputted.

The item "FRAME NO." is to link the information with the frame of the film F. In the case that images in the respective frames of the exposed film are scanned by a film scanner and displayed on a CRT (cathode-ray tube) via a personal computer, the pieces of photographing information can be displayed on the CRT together with the frame image by reading the pieces of the photographing information of a corresponding frame number from the IC card 11. The items in the initial screen include the "TITLE" and the like which have the same contents as those magnetically recorded in the film F. However, since a larger amount of information can be inputted in the IC card 11 than in the magnetic recording area Fb, a more detailed content can be inputted. Although no independent input items are given for pieces of information concerning a photographing technique such as an exposure condition, a light source information (color temperature), information as to the use of flash light, and the type of the film used, these pieces of information may independently be inputted or may hierarchically be inputted as photographing conditions.

Figure 12:
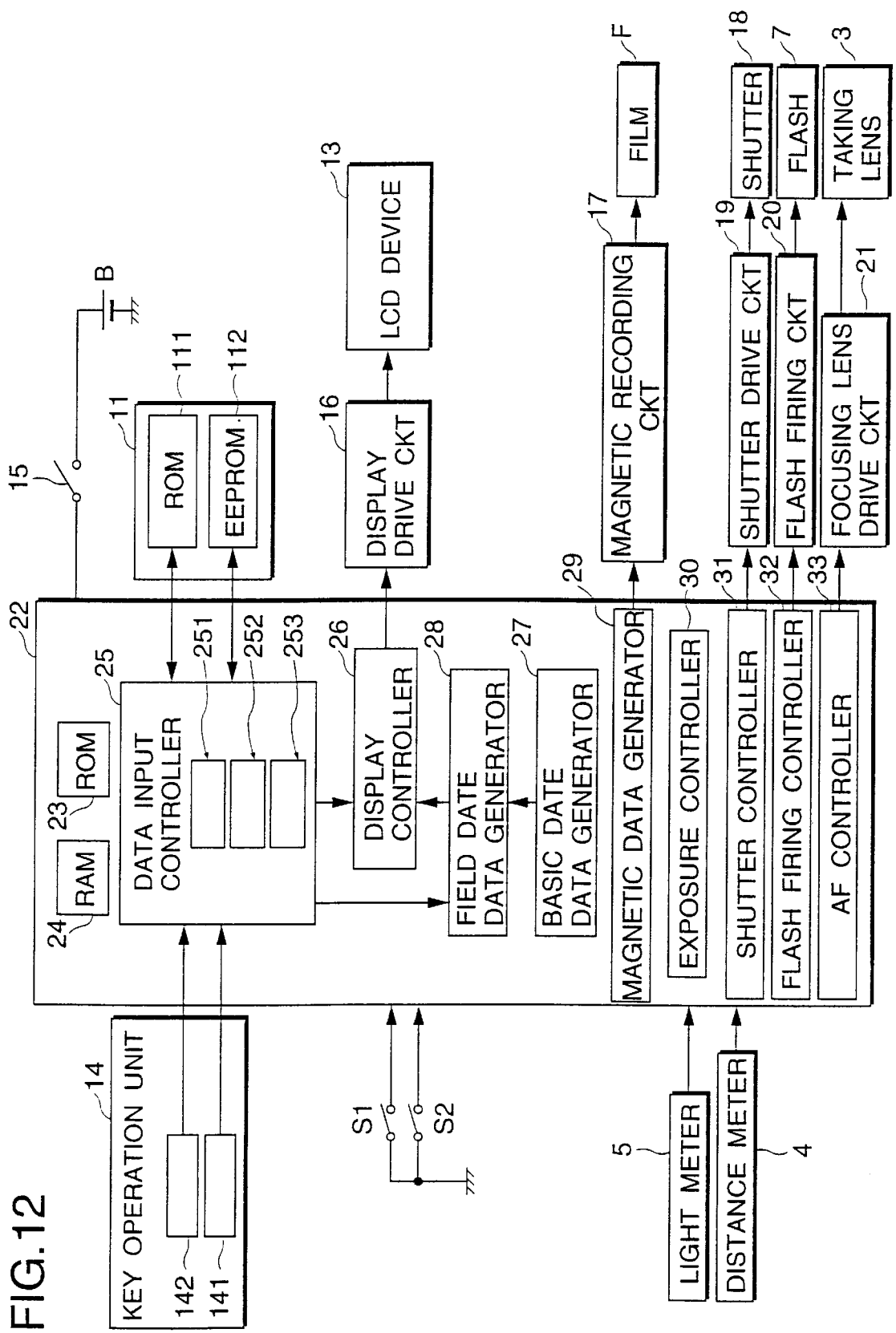
FIG. 12 is a block diagram showing a construction for photographing and display of the camera.

FIG. 12 is a diagram showing one embodiment of a block construction for the photographing and display of the camera 1 according to the invention.

In FIG. 12, the same elements as those described above are identified by the same reference numerals. A switch S1 is turned on when the shutter release button 8 is pressed halfway, thereby instructing a photographing preparation, and a switch S2 is turned on when the shutter release button 8 is fully pressed, thereby instructing a shutter release (exposure control).

The distance meter 4 detects a distance to an object (object distance), and the light meter 5 detects a brightness of the object (object brightness). The detected object distance and the object brightness are inputted in the controller 22 for centrally controlling the photographing and display operations of the camera 1 to calculate automatic focusing (AF) control values and exposure control values.

A battery B is a power source of the camera 1. When the power switch 15 is turned on, powers are supplied to the controller 22 and the other circuits from the battery B, thereby activating the camera 1.

A magnetic recording circuit 17 records a magnetic data in the magnetic recording portion Fb of each frame of the film F. Specifically, the magnetic recording circuit 17 records a magnetic data corresponding to the photographed frame in the magnetic recording area Fb, which magnetic data is outputted from the controller 22 when the film F is wound by one frame after the photographing.

A shutter 18 and a shutter drive circuit 19 are adapted to control an exposure time during the photographing. The shutter drive circuit 19 drives the shutter 18 in accordance with a shutter speed sent from the controller 22 so as to control an exposure amount to a specified level.

A flash firing circuit 20 is adapted to control a firing timing of the built-in flash 7. The circuit 20 causes the built-in flash 7 to be fully fired at a firing timing sent from the controller 22.

A focusing lens drive circuit 21 is adapted to adjust a focal point of the taking lens 3. The circuit 21 drives a focusing lens in the taking lens 3 in accordance with an AF control value sent from the controller 22 to focus the taking lens 3.

The controller 22 centrally controls the photographing operation of the camera 1, the data inputting operation in LCD device 13 and the data display in the LCD device 13. In the camera 1 according to this embodiment, a travel schedule can be inputted as described above. This camera 1 has an additional function of automatically switching the data display to the one conforming to the country or area of the destination during the period of the travel in the case that a schedule of a travel to a country or area having a time difference from a country or area where the user lives is inputted. The controller 22 also controllably switches the date display.

The controller 22 is comprised of a microcomputer and is internally provided with a ROM 23, a RAM 24 (random access memory), a data input controller 25, a basic date data generator 27, a field date data generator 28, a magnetic data generator 29, an exposure controller 30, a shutter controller 31, a flash firing controller 32 and an AF controller 33.

The ROM 23 is a memory for storing a program of various control sequences for the photographing operation, the data inputting operation, etc. and data necessary to implement the program. The RAM 24 is a memory for storing the data when calculations are made for various controls in accordance with the program.

The data input controller 25 controls the data input in the data input mode and the input data confirmation mode. The data input controller 25 includes an input format reading circuit 251, a display data generating circuit 252 and an input data writing circuit 253.

The input format reading circuit 251 reads the input format data from the ROM 111 of the IC card 11. The display data generating circuit 252 converts the data inputted via the key operation unit 14 into a display data in accordance with the input format data read from the IC card 11 and the input format displayed in the LCD device 13. In other words, the data made of characters or the like representing the input format and data made of characters, numbers or the line inputted by the key operation unit 14 are code data, and the display data generating circuit 252 converts the code data into dot display data (dot data) using a preset conversion table. This conversion table is stored in the ROM 23.

When the data input mode and the input data confirmation mode are set, the data input controller 25 causes the input format reading circuit 251 to read the input format data from the ROM 111 of the IC card 11, causes the display data generating circuit 252 to convert the read input format data into a dot data for the display, and then outputs the converted dot data to the display controller 26. The display controller 26 outputs the received dot data to the display drive circuit 16, which causes the input format to be displayed in the LCD device 13, thereby enabling the data input.

When the data are inputted by the key operation unit 14 in accordance with the input format displayed in the LCD device 13 in the data input mode and the input data confirmation mode, the data input controller 25 causes the display data generating circuit 252 to convert the input data into a dot data for the display, and then outputs the obtained dot data to the display controller 26. The display controller 26 outputs the received dot data to the display drive circuit 16, which causes the inputted characters and/or numbers to be displayed is a specified display position of the LCD device 13.

The input data writing circuit 253 is adapted to write the data (code data) inputted by the key operation unit 14 in accordance with the input format in the EEPROM 112 of the IC card 11.

The display controller 26 controls the display content of the LCD device 13 in accordance with the set mode. When the data input mode or the input data confirmation mode is set, the display controller 26 outputs the dot data for the display inputted from the data input controller 25 to the display drive circuit 16, thereby causing a data input display (see FIGS. 8 to 10) to be made in the LCD device 13. When the data display mode (initially set mode in the normal mode), the display controller 26 outputs a date data (dot data) inputted from the field date data generator 28 to the display drive circuit 16, thereby causing a date display (see FIG. 7) to be made in the LCD device 13.

The basic date data generator 27 generates a basic time data (month/day/year), and includes a reference clock and a date calculating circuit. The basic date data generator 27 converts a time counted by the reference clock into a display mode of month/day/year based on the EST (Eastern Standard Time) of the United States and outputs it to the display controller 26. It should be noted that if an other display format is set, the counted time is converted into this display format.

Figure 13:
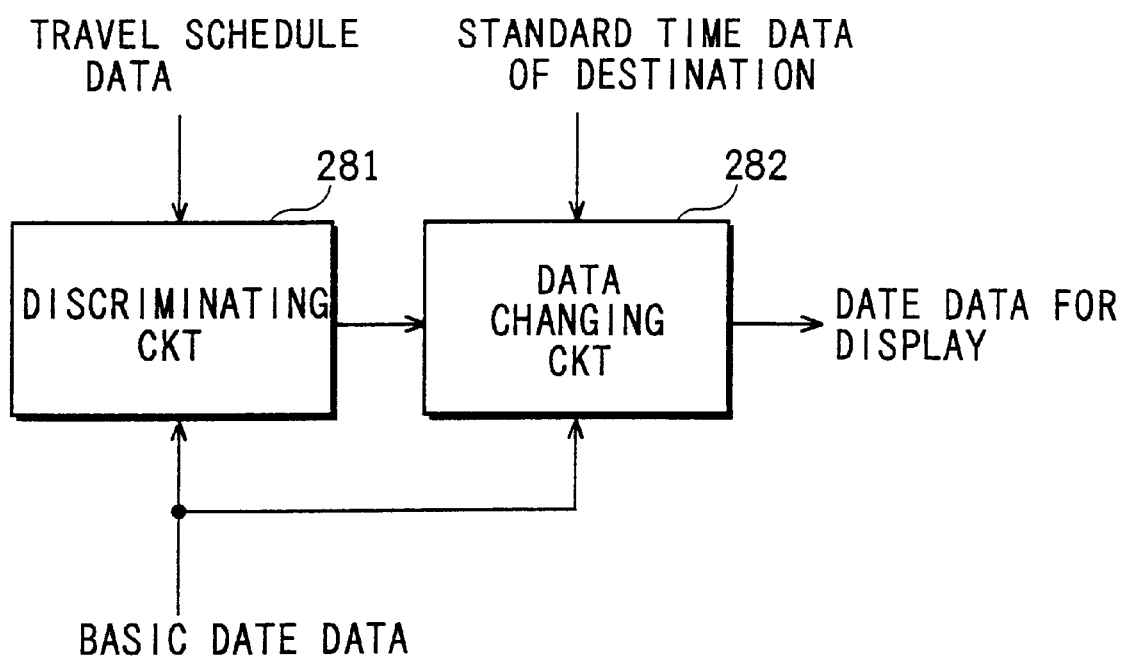
FIG. 13 is a diagram showing an internal circuitry of a date data changing device.

The field date data generator 28 changes the date data generated by the basic date data generator 27 into a date data based on the standard time of the destination during the period of the travel in the case a schedule of travel to a destination which has a time difference from where a user lives is inputted. The field date data generator 28 is internally provided with a judging circuit 281 and a data changing circuit 282 as shown in FIG. 13.

The judging circuit 281 judges whether the basic time of the EST of the United States falls within the period of the scheduled travel (i.e., whether the user is on his travels). To the judging circuit 281 are inputted at least travel period data of the travel schedule data read from the IC card 11 from the data input controller 25 and the basic EST data from the basic date data generator 27. The judging circuit 281 judges whether the basic time of EST falls within the travel period by comparing the basic time of EST with the travel period and outputs the judgment result to the data changing circuit 282.

If a schedule of travel to England as shown in FIG. 14 is, for example, inputted in the IC card 11, a travel period data "8.14, 1997 to 8.31, 1997" is inputted to the judging circuit. If the basic time of EST inputted to the judging circuit 281 from the basic date data generator 27 is, for example, "7.24, 1997", the basic time of EST does not fall within the travel period. Accordingly, the judgment result that the basic time of EST falls outside the travel period is outputted to the data changing circuit 282 from the judging circuit 281. If the basic time of EST is, for example, "8.14, 1997", the judgment result that the basic time of EST falls within the travel period is outputted to the data changing circuit 282 from the judging circuit 281.

If no schedule of travel is inputted in the IC card 11, the travel period data is not inputted to the judging circuit 281 from the data input controller 25. Accordingly, in this case, the judgment result that the basic time of EST falls outside the travel period is outputted to the data changing circuit 282 from the judging circuit 281.

The data changing circuit 282 changes the date data generated based on the EST by the basic date data generator 27 into a date data based on the standard time of the destination of the travel. The data changing circuit 282 does so by adding a time difference between the EST and the standard time of the destination to the date data inputted from the basic date data generator 27, and outputs the changed date data to the display controller 26. For example, in the case of the aforementioned travel to England, if the date data inputted from the basic date data generator 27 is "8.14, 1997, AM 11:31", the date data is changed into "8.14, 1997, PM 3:31" by adding a time difference of +4 hours, and the changed date data is outputted to the display controller 26.

Time difference data between EST and the standard times of main countries and areas used to change the date data are stored in the ROM 111 of the IC card 11. When the IC card 11 is mounted in the camera 1, the time difference data are read and inputted in the data changing circuit 282. The time difference data may be stored in the ROM 23 of the controller 22.

The display controller 26 outputs the date data inputted from the field date data generator 28 to the display drive circuit 16 in the date display mode. Accordingly, the date data such as month/day/year based on the EST is displayed in the LCD device 13 unless the user is on his travels, whereas the date data based on the standard time of the destination is displayed in the LCD device 13 while he is on his travels.

In the above example, the date data based on the EST is displayed in the LCD device 13 as shown in FIG. 7 unless the user is on his travels in England, whereas the date data based on the English standard time is displayed in the LCD device 13 as shown in FIG. 15 while he is on his travels in England.

As shown in FIG. 14, the name of the country or area ("England" in FIG. 14) may be displayed together with the date data so that the standard time of which country or area is used can be understood. This makes it easily understandable that the date data of New York is displayed after being changed. Further, as shown in dotted line in FIG. 14, the date based on the EST may also be displayed. This is convenient to immediately know the EST when the user tries to communicate with New York, e.g., by telephone at the destination of the travel. These display methods may selectively be set by the user in order to enhance a degree of freedom of the display methods.

Referring back to FIG. 12, the magnetic data generator 29 generates magnetic data to be recorded in the magnetic recording areas Fb of the film F. The magnetic data also include the data inputted by the key operation unit 14 in the magnetic data input mode. The generated magnetic data are outputted to the magnetic recording circuit 17, which in turn records the magnetic data in the magnetic recording area Fb of the film F.

The exposure calculator 30 calculates exposure control values (aperture value, shutter speed) using the object brightness detected by the light meter 5. The shutter controller 31 controls an exposure time (shutter release time) during the exposure control based on the shutter speed calculated by the exposure calculator 30. The shutter controller 31 controls the exposure time by controlling opening and closing timings of the shutter 18. The flash firing controller 32 controls the firing of the built-in flash 7 and a flash firing timing during the flash firing photographing. The AF controller 33 controls the automatic focusing of the taking lens 3. The AF controller 33 calculates a drive control value for the focusing lens using the object distance detected by the distance meter 4 and outputs the drive control value to the focusing lens drive circuit 21.

Next, the photographing operation, the data inputting operation and the date display of the camera 1 are described with reference to flowcharts of FIGS. 16 and 17.

Figure 16:
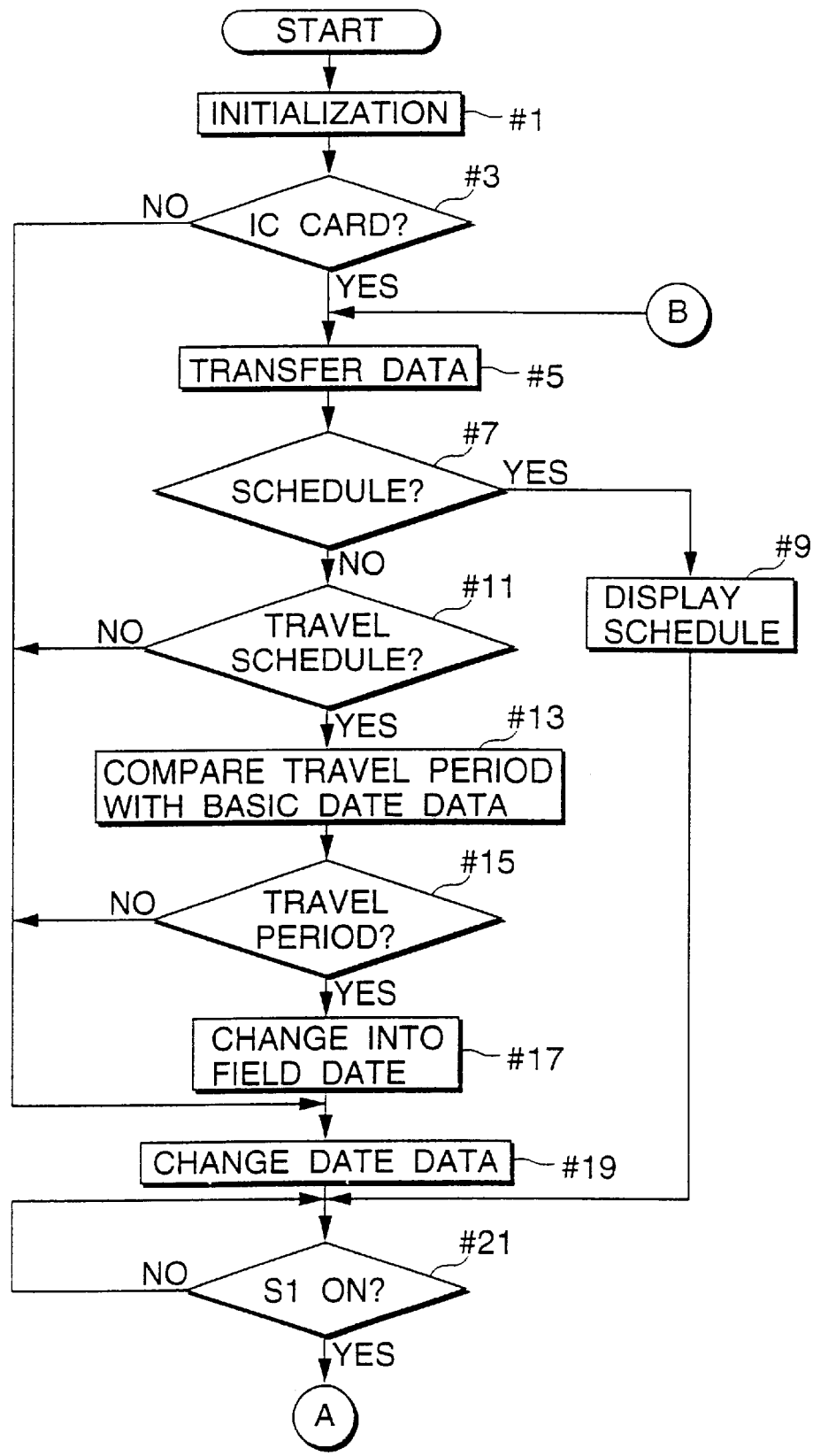
FIGS. 16 and 17 is a flowchart showing basic sequences of the photographing, date input and date display of the camera.
Figure 17:
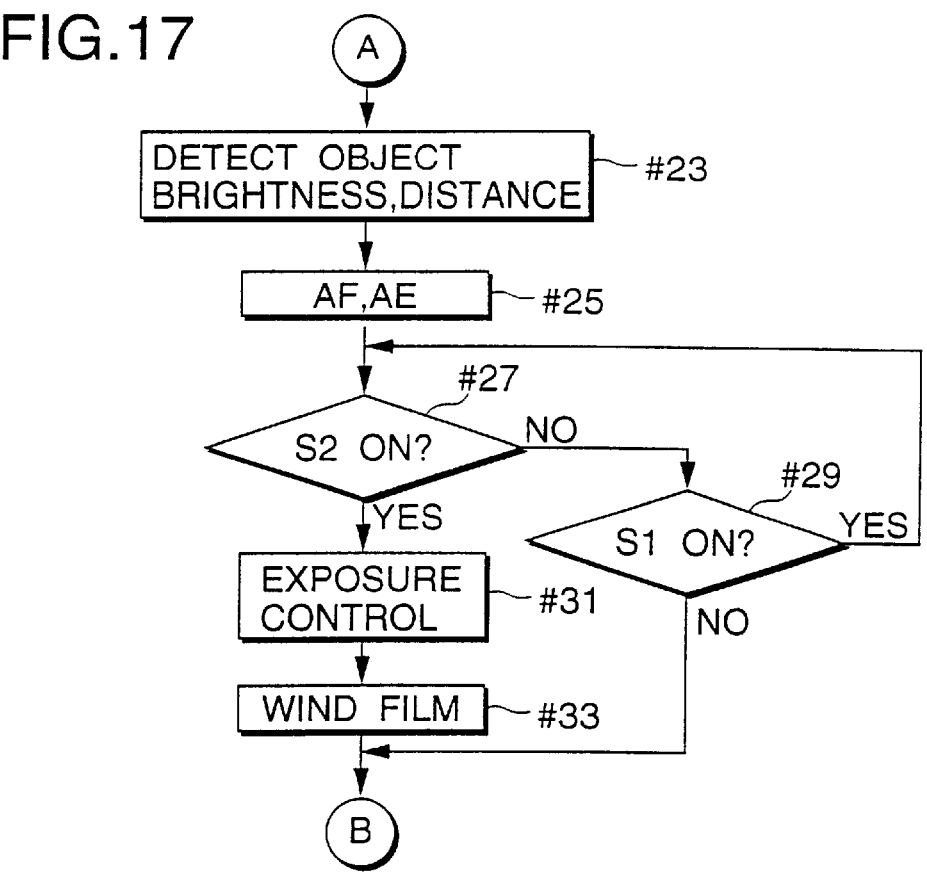

FIGS. 16 and 17 are flowcharts showing basic sequences of the photographing operation, the data inputting operation and the date display. These flowcharts are for the case where the IC card 11 for schedules is used.

When the camera 1 is activated by turning the power switch 15 on, the controller 22 and various other circuits are initialized (setting of the initial data, initial modes and the like, resetting of flags, etc.) (Step #1). Subsequently, it is judged whether the IC card 11 is mounted in the card chamber 10 (step #3). If the IC card 11 is mounted (YES in Step #3), the schedule data stored in the EEPROM 112 of the IC card 11 is transferred to the controller 22 (Step #5).

Subsequently, if the read data is schedules, it is judged whether a schedule corresponding to the basic time exists by searching scheduled times of the schedule contents (Step #7). If such a schedule exists (YES in Step #7), the date display mode initially set is changed to the input data confirmation mode and the schedule is displayed in the LCD device 13 (Step #9). For example, events scheduled for that day and, if the basic time is still in the morning, schedules relatively shortly after the basic time such as schedules in the morning are displayed in the LCD device 13.

This schedule display is designed to enhance the convenience of the camera 1 as a schedule management equipment since the camera 1 can record information concerning the photographing as well as other pieces of information such as schedules, taking advantage of the key operation unit 14. In other words, the schedule display prevents the user from forgetting the schedules.

On the other hand, if no schedule shortly after the basic time exists (NO in Step #7), it is judged whether a travel schedule exists (Step #11). If a travel schedule exits (YES in Step #11), it is judged whether the user is on his travels by comparing the data on the travel period with the basic date data generated by the basic date data generator 27 (Steps #13, #15). If the basic date data falls within the travel period (YES in Step #15), it is changed to the date data based on the standard time of the destination by adding a time difference between the EST and the standard time of the destination (Step #17), and the changed date data is displayed in the LCD device 13 (Step #19). In other words, the basic time at the destination is displayed in the LCD device 13 while the user is on his travels.

On the other hand, if the IC card 11 is not mounted in the card chamber 10 (NO in Step #3), if the travel schedule is not inputted (NO in Step #11) or if the basic date data falls outside the travel period even though the travel schedule is inputted (NO in Step #15), the date data generated based on the EST is displayed in the LCD device 13 (Step #19). In other words, the EST is displayed in the LCD device 13 unless the user is on his travels or any travel is scheduled.

The date display or schedule display is continued until the switch S1 is turned on (Step #21). When the switch S1 is turned on by pressing the shutter release button 8 halfway (YES in Step #21), the object brightness is detected by the light meter 5; the exposure control values are calculated by the exposure calculator 30 using the detected object brightness; the object distance is detected by the distance meter 4; and the AF control value is calculated by the AF controller 33 using the detected object distance (Step #23).

Subsequently, the taking lens 3 is focused based on the calculated AF control value, and the aperture value and shutter speed are adjusted based on the exposure control value (Step #25), entering a standby state for a shutter release instruction (a loop of Steps #27, #29).

When the shutter release button 8 is fully pressed in the standby state, turning the switch S2 on (YES in Step #27), a photographing operation (exposure control) is performed (Step #31). If the shutter release button 8 is released during the standby period (NO in Step #29), this routine returns to Step #5 to perform the aforementioned photographing preparation again.

When the photographing operation is completed, the film F is wound by one frame (Step #33) and this routine returns to Step #5 for a next photographing operation. While the film F is wound, the magnetic data corresponding to the photographed frame is recorded in the magnetic recording area Fb of the film F by the magnetic recording circuit 17. At this time, if the data concerning the photographed frame is stored in the IC card 11, the magnetic data includes a data for linking the photographed frame with the stored data (e.g., frame number or a control number in the case a control number is affixed to the data stored in the IC card 11).

The magnetic data includes the data for linking the photographed frame with the data stored in the IC card 11 (hereinafter, "card data") for the following reason. In the case that a film image reproducing system is constructed by a film scanner 34 for reading images recorded in a film and also reading card data and magnetic data recorded in the film F, a personal computer 35 and a CRT 46 as shown in FIG. 19, the frame images of the film F can be displayed together with the card data and the magnetic data on the CRT 35.

Figure 19:
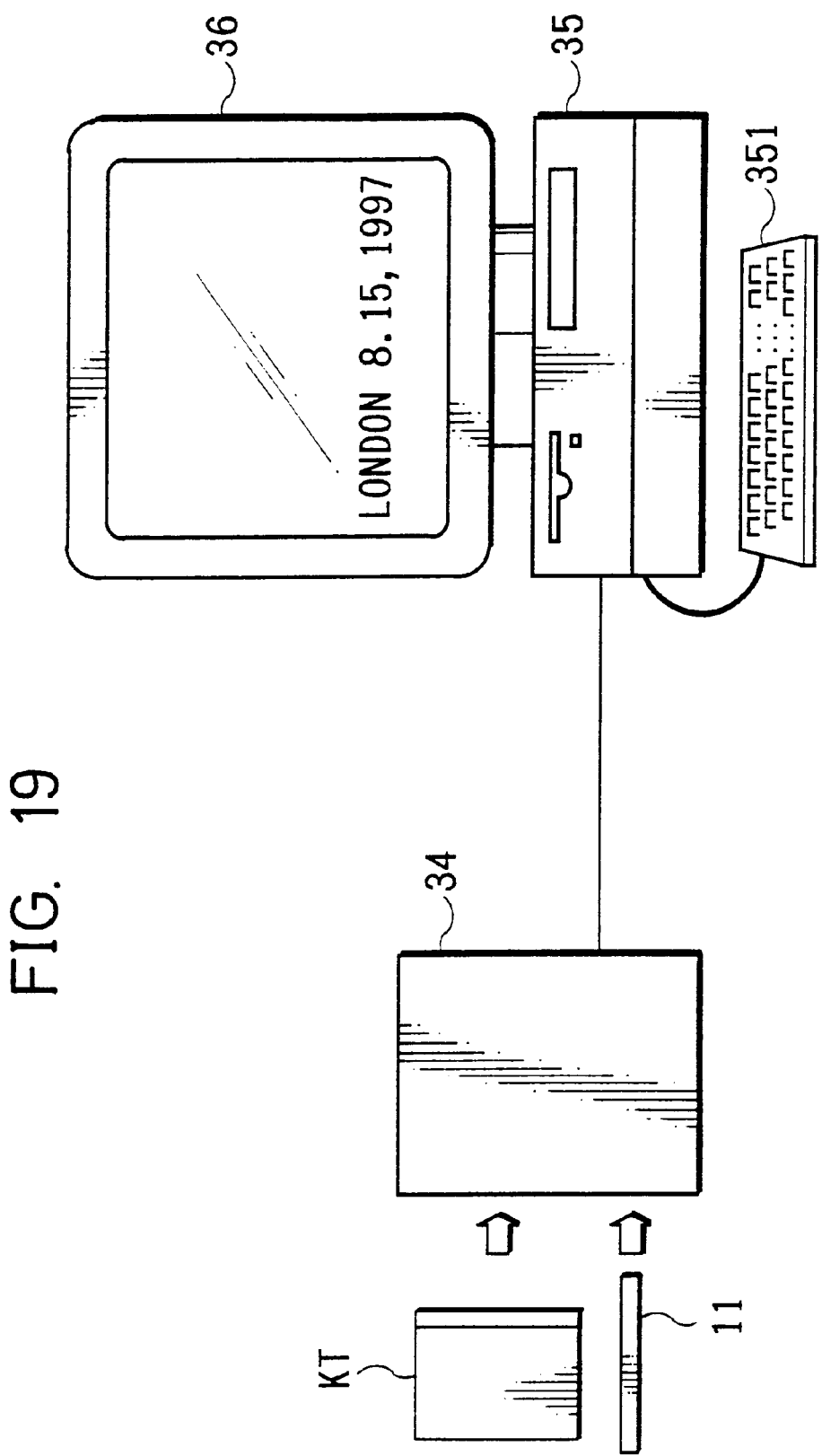
FIG. 19 is a diagram showing a system for reproducing an image on a CRT of a personal computer by linking an image recorded in a film and a data stored in the IC card.

In the film image reproducing system shown in FIG. 19, the film scanner 34 reads the images and the magnetic data recorded in all the frames of the film F contained in the film cartridge KT as well as the data stored in the IC card 11. These image data, magnetic and card data (code data) are transferred to the personal computer 35, which in turn starts preparing the reproduction of the film images. When a frame to be reproduced (frame number) is designated via a keyboard 351 of the personal computer 35, the image data, magnetic data and card data read by the film scanner are searched based on the frame number and the image corresponding to the designated frame number is reproduced on the CRT 36 and the title, date of photographing, place of photographing and the like recorded as the magnetic data and card data are displayed as character information in specified positions on the display screen of the CRT 36.

In the example of FIG. 19, a picture taken in London by the user traveled as scheduled is reproduced on the CRT 36. The place of photographing, date of photographing, a photographer and other data stored in the IC card 11 are also displayed at the bottom of the display screen of the CRT 36.

In the above processing, in the case that the user travels to a country lying in the same zone as the country he lives, there is no change in the time displayed because there is no time difference. The same processing, date display and recording as above may be performed in this case as well. Alternatively, in the case that there is judged to be no time difference, the same processing as the one performed when no travel schedule is inputted may be performed.

Figure 18:
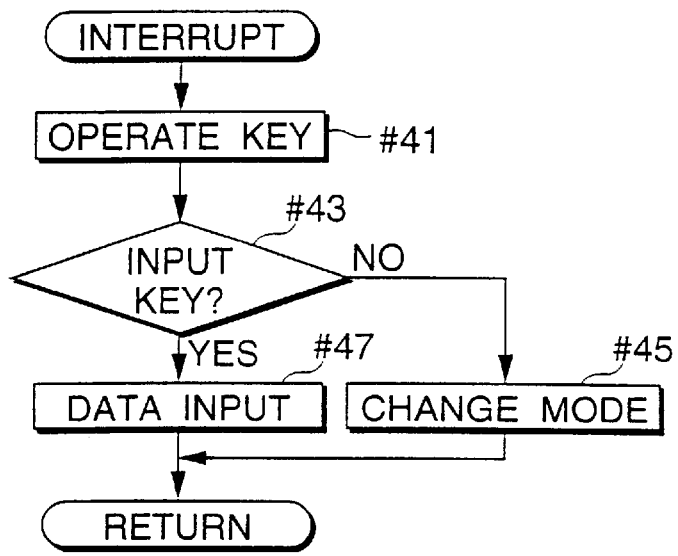
FIG. 18 is a flowchart showing an interrupt processing performed when a key is operated.

FIG. 18 is a flowchart showing an "Interrupt" routine implemented by operating the key operation unit 14. If the key operation unit 14 is operated while the processing of the basic sequence shown in FIGS. 16 and 17 is performed, the "Interrupt" routine shown in FIG. 18 is implemented.

Specifically, when the key operation unit 14 is operated (Step #41), the type of the operated key is judged (Step #43). If the operated key concerns a mode change (NO in Step #43), the display mode of the LCD device 13 is changed to the set mode (Step #45). For example, if the "data input mode" is inputted when the "date display mode" is set, the display mode is changed from the "date display mode" to the "data input mode" and the date display in the LCD device 13 is changed to the display of the input format read from the IC card 11.

Unless the operated key concerns the mode change (YES in Step #43), a data input processing corresponding to the key operation is performed (Step #47) since the key is operated for the data input. It should be appreciated that this key operation is not actually received in the date display mode since it is an operation in the data input mode or the input data confirmation mode.

In the data input mode, the input data confirmation mode or magnetic data input mode, the inputted data are displayed in the specified display positions of the LCD device 13 after being converted into display data (dot data). This interrupt routine is implemented every time the key is operated, and a display processing corresponding to the key operation of the key operation unit 14 is performed.

In the foregoing embodiment, the usual date display is made based on the EST since a foreign travel from New York is planned. In the case that a foreign travel from a country or area other than New York is planned, the usual date display is made based on the standard time of this country or area.

Although the foreign travel from New York to England is described in the foregoing embodiment, the invention is also applicable to a case where the user travels from New York where the EST is adopted to another area where the Pacific Standard Time is adopted.

Although the schedule of a short travel is described in the foregoing embodiment, the travel means not only a narrowly defined travel such as a sightseeing travel, but also a travel in which the user travels from a first country or area to a country or area (particularly having a different standard time) other than the first country or area to stay for a predetermined long period. Accordingly, the data generating device is applicable provided that a schedule is inputted regardless of the purpose and/or period of the stay and even in the case of a temporary departure from a country.

If the travel schedule is stored in the IC card 11 as described above, the data displayed in the EST in the LCD device 13 is automatically changed to the one at the destination during the period of the travel. Accordingly, when the user travels with the camera 1, cumbersomeness to manually change the date display of the camera 1 to a local date can be eliminated. Further, in the case that the date displayed in the LCD device 13 is imprinted in a picture, the date based on the EST will not mistakenly be imprinted in the picture at the destination.

Although the data generating device provided in the camera is described in the foregoing embodiment, the present invention is not limited thereto, but may be applicable to a data generating device for use in a portable information terminal apparatus such as an electronic organizer, a laptop or a notebook type personal computer.

As described above, at least travel schedule including the name and standard time of the second country or area can be inputted in the data generating device for generating data on the date based on the standard time of the first country or area, and the date based on the standard time of the first country or area is changed to the date based on the standard time of the second country or area and the changed date is displayed in the display device during the period of the travel if the travel schedule is inputted. Accordingly, in the case that the schedule is inputted in advance, the date of the destination is automatically displayed when the user brings the data generating device to his trip, eliminating a cumbersomeness to manually change the date.

Further, since the name of the second country or area is displayed together with the date based on the standard time thereof, whether the date displayed in the display device is a changed date or a usual date can easily be judged.

Furthermore, the first storage device for storing the travel schedule and the second storage device for storing a time difference data used to change the date based on the standard time of the first country or area to the date based on the standard time of the second country or area are provided in the same detachable external storage medium. This reduces the burden of the circuit construction of the data generating device and makes it easy to rearrange the stored data and to change the content of the stored data.

Further, if the data generating device is provided in the camera having a date imprinting function, there is no likelihood that, even if a picture is taken in a country or area having a time difference from where the user lives, a date different from the one of this country or area is imprinted in a picture.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A data generating device comprising:
   a basic date data generator which generates basic date data of a basic place;
   a memory which stores data concerning places, and data on a schedule of travel between places; and
   a field date data generator which automatically determines, based on the place data and the schedule data stored in the memory, where a field place is, and generates date data of a determined field place based on the basic date data and the determined field place.

2. A data generating device according to claim 1, further comprising a memory which stores data concerning a time difference between the basic place and each of the other places.

3. A data generating device according to claim 1, further comprising a display device which displays date data of the determined field place.

4. A data generating device comprising:
   a first date data generator which generates first date data;
   a memory which stores a relationship between the first date data and date data of a field place; and
   a second date data generator which determines, based on the first date data, where a field place is, and generates second date data based on the first date data and the relationship.

5. A data generating device according to claim 4, further comprising a memory which stores data concerning a time difference between the place of the first date data and each of the other places.

6. A data generating device according to claim 4, further comprising a display device which displays date data of a field place.

7. A portable apparatus comprising:
   a basic date data generator which generates basic date data of a basic place;
   an input section through which place data concerning places and travel schedule data are input;
   a memory which stores input place data and schedule data in connection with the input place data; and
   a field date data generator which determines, based on the place data and the schedule data stored in the memory, where a field place is, and generates date data of a determined field place based on the basic date data and the determined field place.

8. A portable apparatus according to claim 7, further comprising a memory which stores data concerning a time difference between the basic place and each of the other places.

9. A portable apparatus according to claim 7, further comprising a display device which displays date data of a field place.

10. A portable apparatus according to claim 7, further comprising an image pickup device which picks up an image of an object.

11. A portable apparatus according to claim 10, further comprising a recording device which records data about an image pickup, wherein the input section is operable to input data about an image pickup.

12. A portable apparatus comprising:
a first date data generator which generates first date data;
an input section through which date data of places are input;
a memory which stores a relationship between the first date data and the date data of places; and
a second date data generator which determines, based on the first date data, where a field place is, and generates second date data based on the first date data and the relationship.

13. A portable apparatus according to claim 12, further comprising a memory which stores data about a time difference between the place of the first date data and each of the other places.

14. A portable apparatus according to claim 12 further comprising a display device which displays date data of a field place.

15. A portable apparatus according to claim 12, further comprising an image pickup device which picks up an image of an object.

16. A portable apparatus according to claim 15, further comprising a recording device which records data about an image pickup, wherein the input section is operable to input data about an image pickup.

17. A camera comprising:
means for generating basic date data based on a standard time of a first place;
means for displaying date data;
first means for storing data on a second place and data on travel schedule for the second place;
second means for storing data on time difference between the standard time of the first place and a standard time of the second place;
means for changing generated basic date data into field date data of the second place based on the time difference data stored in the second storing means;
means for determining, based on the travel schedule data, whether generated basic date data corresponds to a traveling period of the second place; and
means for controlling the displaying means to display the field date data of the second place when the generated basic date data is determined to correspond to a traveling period of the second place.

18. A camera according to claim 17, wherein the controlling means controls the displaying means to display name of the second place in addition to the field date data of the second place.

19. A camera according to claim 17, wherein the first and second storing means are defined in a storage medium removably attached in the camera.

20. A portable apparatus comprising:
a calendar unit including a time counter;
a display unit which displays at least one of a date and a time based on the calendar unit;
a first memory which stores data on a travel schedule including a stay place and a stay period;
a second memory which stores data on a time lag between a departure place and the stay place; and
a controller which controls the display unit to display at least one of a date and a time of the stay place based on the travel schedule data stored in the first memory and the time lag data stored in the second memory.

21. A portable apparatus according to claim 20, wherein said display unit displays a time, and said controller controls the display unit to display the at least one of the date and the time of the stay place based on the travel schedule data stored in the first memory and the time lag data stored in the second memory.

22. A portable apparatus comprising:
a calendar unit including a time counter;
a display unit which displays at least one of a date and a time based on the calendar;
a first memory which stores data on a travel schedule including a stay place and a stay period;
a second memory which stores data on a time lag between a departure place and the stay place; and
a time changer which changes the at least one of the date and the time based on the travel schedule data stored in the first memory and the time lag data stored in the second memory, and controls the display unit to display at least one of a changed date and a changed time.

* * * * *